United States Patent
Schaedler et al.

(10) Patent No.: US 6,474,054 B2
(45) Date of Patent: Nov. 5, 2002

(54) REAR DISCHARGE MOWER

(75) Inventors: Axel Schaedler, Medina; John Robertson, Berea, both of OH (US)

(73) Assignee: MTD Products, Inc., Cleveland, OH (US)

( * ) Notice: Subject to any disclaimer, the term of this patent is extended or adjusted under 35 U.S.C. 154(b) by 0 days.

(21) Appl. No.: 09/370,816

(22) Filed: Aug. 9, 1999

(65) Prior Publication Data

US 2002/0002813 A1 Jan. 10, 2002

Related U.S. Application Data

(60) Provisional application No. 60/098,813, filed on Sep. 2, 1998.

(51) Int. Cl.[7] .................. A01D 34/03; A01D 34/43; A01D 34/64
(52) U.S. Cl. ........................................ 56/16.7; 56/203
(58) Field of Search ................ 56/202, 13.3, 320.2, 56/203, 194, 16.6, 16.7, DIG. 15

(56) References Cited

U.S. PATENT DOCUMENTS

| | | | | |
|---|---|---|---|---|
| 3,757,503 A | * | 9/1973 | Soldavini | 56/202 |
| 3,969,876 A | | 7/1976 | Turos | 56/202 |
| 4,047,368 A | * | 9/1977 | Peterson | 56/202 |
| 4,064,680 A | * | 12/1977 | Fleigle | 56/11.9 |
| 4,068,455 A | * | 1/1978 | Zehrung, Jr. et al. | 56/344 |
| 4,149,362 A | * | 4/1979 | Haffner et al. | 56/202 |
| 4,233,806 A | * | 11/1980 | Richardson | 56/202 |
| 4,345,418 A | * | 8/1982 | Arizpe | 56/202 |
| 4,566,257 A | * | 1/1986 | Akrabawi | 56/202 |
| 4,631,909 A | * | 12/1986 | McLane | 56/202 |
| 4,785,612 A | * | 11/1988 | Morishita et al. | 56/17.2 |
| 6,038,840 A | * | 3/2000 | Ishimori et al. | 56/13.3 |
| 6,098,740 A | * | 8/2000 | Abend et al. | 180/374 |

FOREIGN PATENT DOCUMENTS

| | | | |
|---|---|---|---|
| DE | 4413332 | 10/1995 | 34/68 |
| DE | 1952715 | 2/1996 | |
| EP | 0155437 | 12/1984 | 34/64 |
| EP | 0300383 | 7/1988 | 34/68 |
| EP | 0532068 | 7/1992 | 34/70 |

* cited by examiner

Primary Examiner—Robert E. Pezzuto
Assistant Examiner—Árpád Fab Kovács
(74) Attorney, Agent, or Firm—Emerson & Skeriotis; Roger D. Emerson; Timothy D. Bennett

(57) ABSTRACT

A rear discharge mower includes a frame, a drive wheel having a drive axle and a mower deck supported by the frame. The mower also includes a discharge chute used in transporting cut vegetation from the mower deck to a grass bag. A drive system includes a transmission and is used in driving the drive wheel. The transmission is positioned in line with the drive axle. The inventive arrangement of this rear discharge mower provides for a direct chute having a large cross-sectional area and yet including transmission that is in line.

15 Claims, 5 Drawing Sheets

REAR DISCHARGE MOWER

This Utility Patent Application claims priority from Provisional Patent application Ser. No. 60/098,813 filed Sep. 2, 1998.

BACKGROUND OF THE INVENTION

1. Field of the Invention

This invention relates to rear discharge lawn mowers and more particularly to the orientation of the rear discharge chute on a rear discharge lawn mower.

2. Description of the Related Art

It is well known to provide lawn mowers with apparatuses that are used in moving cut grass clippings from a mower deck where the grass is cut to a grass bag positioned at the rear of the mower. Often the discharge chute that transports the clippings from the mower deck to the grass bag takes a circuitous route from a side of the mower deck, around an operator seat and then to the grass bag located behind the operator seat. It may be preferred, however, to provide a more direct route for the discharge chute from the rear of the mower deck to the grass bag. A mower having this type of discharge chute is commonly referred to as a rear discharge mower. There are, however, difficulties with known rear discharge mowers. Generally speaking, the larger the cross-sectional area of the discharge chute and the more direct its route to the grass bag, the better the operation of the mower.

One difficulty with known rear discharge mowers is related to the location of the mower transmission. Ordinarily, for rear wheel drive mowers, transmissions are placed near the rear axle of the mower. This provides for a more efficient drive train. For this reason, however, transmissions are generally positioned between the mower deck (usually positioned near the front or near the middle of the mower) and the grass bag (usually positioned rearward of the transmission). This makes it difficult to provide a direct route for the discharge chute, as the transmission must be circumvented. Such indirect routs reduce the efficiency of the mower.

Another related difficulty is that the available cross-sectional area for the discharge chute is greatly reduced. As noted above, the transmission interferes with the direct route of the discharge chute. The transmission and/or any differential, rear axle, mower frame elements, or the like toward the rear of the mower limit the area available for the discharge chute to occupy. This results in relatively small cross-sectional areas for the discharge chute and again reduces the efficiency of the mower.

In an effort to reduce these difficulties, it is known to provide the transmission at a location above the rear axle. This provides additional room to route the discharge chute. This raised transmission orientation, however, also has difficulties. One problem is that the transmission can no longer be positioned "in line" with the rear axle. By "in line" it is meant that the transmission is substantially on the same vertical plane with the rear axle and/or differential. Thus, the raised transmission orientation requires additional components such as a chain drive to connect the transmission to the rear axle or differential. Such additional components increase the weight and cost of the mower and tend to reduce the efficiency of the drive system.

The present invention provides a new and improved rear discharge mower that provides a direct discharge chute having a large cross-sectional area and yet includes an in line transmission. This invention is simple in design, effective in use, and overcomes the foregoing difficulties and others while providing better and more advantageous overall results.

SUMMARY OF THE INVENTION

The present invention, a new and improved rear discharge mower, provides for a direct route for a discharge chute between a mower deck and a grass bag while maintaining maximum cross-section areas for the discharge chute. In this way, mower performance is maximized.

According to one aspect of this invention a mower has a frame with first and second ends on opposite sides as well as a first drive wheel having a drive axle. A mower deck is supported by the frame and has at least one cutting blade for use in cutting vegetation. A discharge chute transports cut vegetation from the mower deck. The mower also includes a drive system that uses a gear reduction device for use in driving the drive wheel. The gear reduction device is positioned in line with the drive axle. An engine is used to rotate the cutting blade and also to provide power to the drive system. The discharge chute has a cross sectional area A1 through a vertical plain that is parallel to the drive axle. A chute area A2 is provided through the same vertical plain. The chute area A2 is defined on the top by a horizontal line that intersects a top most edge of the discharge chute. The chute area A2 is defined on the sides by first and second vertical lines that intersect the first and second frame ends. The chute area A2 is defined on the bottom by the drive axle. The cross sectional area A1 and chute area A2 form an area ratio A1/A2 of at least 0.25.

According to another aspect of this invention the mower also includes a grass bag that is connected to the rear end of the frame. The discharge chute extends from a rear portion of the mower deck under an operator seat and then into the grass bag.

According to another aspect of this invention the gear reduction device has first and second housing members with flange portions that are connectable to form a flange connection. Preferably this flange connection is substantially vertical in alignment.

According to yet another aspect of this invention both the discharge chute and the gear reduction device are in an off-center position.

An object of the present invention is to provide room inside the rear discharge lawn mower for a large, rear-exit discharge chute.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part hereof and wherein.

DESCRIPTION OF THE PREFERRED EMBODIMENT

Figure 1:
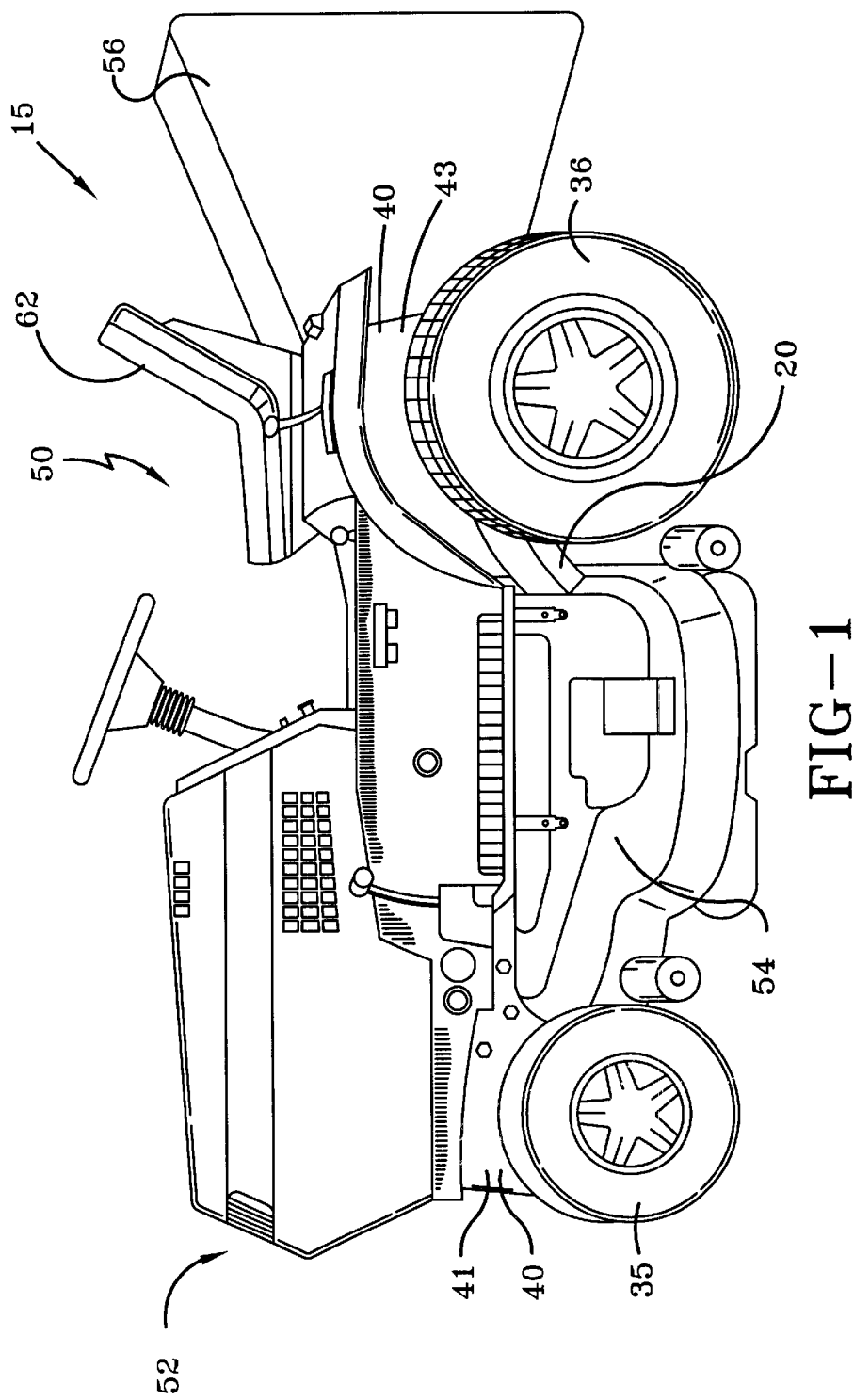
FIG. 1 is a side view of a rear discharge lawn mower with the current invention incorporated therein.

Referring now to the drawings, which are for purposes of illustrating a preferred embodiment of the invention only, and not for purposes of limiting the invention, FIG. 1 shows a mower 50 according to this invention. While the invention described herein could be used on any vehicle or device with a chute (discharge chute 20 shown in FIG. 2), it will be described with reference to a mower 50 of the preferred embodiment, that being a rear discharge lawn mower. The mower 50 includes a frame 40 having first and second ends 41, 43. The frame 40 supports front and rear wheels 35, 36 at least one of which (preferably a rear wheel 36) is driven by a drive system 15 that is powered by an engine 52 that in the preferred embodiment is located at the front of the mower. The engine 52 is also used to rotate at least one cutting blade (not shown) within a mower deck 54 for use in cutting associated vegetation (not shown). The particular method of coupling the engine 52 to the cutting blade may be of any type chosen with sound engineering judgement and still work well with this invention. Many such methods are commonly known to those in the art and thus will not be discussed in detail.

Figure 2:
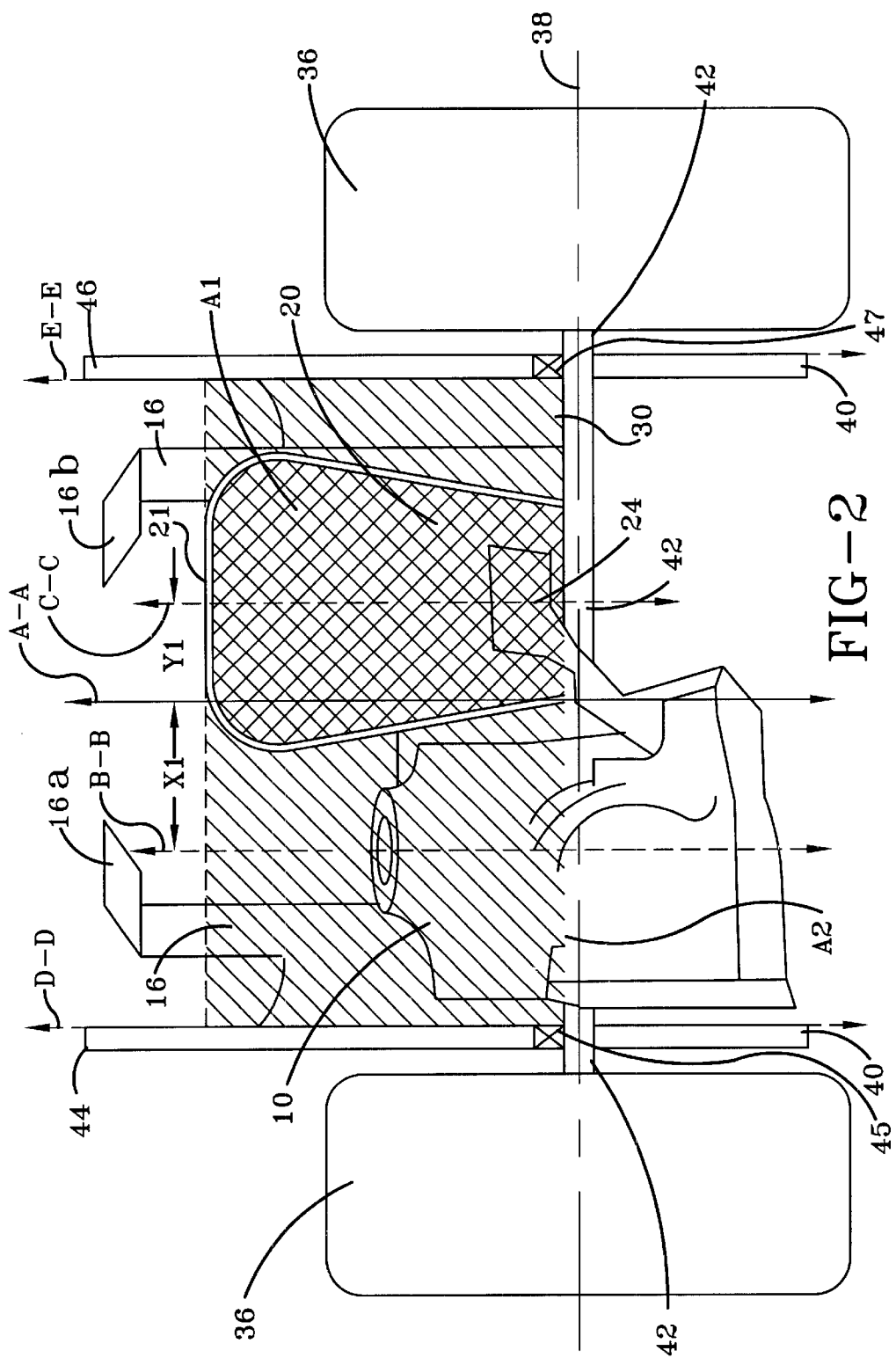
FIG. 2 is a rear cross-sectional view of the rear discharge lawn mower showing the off-center transmission and off-center discharge chute.

With reference now to FIGS. 1–2, the mower deck 54 may be connected to a grass bag 56 by way of the discharge chute 20 so that that cut grass clippings (not shown) and the like can be transported from the mower deck 54 to the grass bag 56. Preferably, the grass bag 56 is attached to the rear 43 of the frame 40. As is commonly known, the grass bag 56 is used to store grass clippings until it reaches a "full" condition when the grass bag 56 is then emptied for further use in collecting such clippings. The particular grass bag 56 can be any type of collection bag chosen using sound engineering judgment. It should be noted, however, that a grass bag is not essential for this invention. The mower may, for example, discharge cut vegetation directly from the discharge chute 20 to the ground. Alternatively, a vehicle may not include a mower deck or a grass bag but use a chute for another purpose chosen with sound engineering judgement. To provide the least circuitous route for the discharge chute 20, it should be noted that the discharge chute 20 preferably extends from a rear portion of the mower deck 54, extends under an operator seat 62 then connects to the grass bag 56.

With continuing reference to FIGS. 1–2, the drive system 15 communicates power from the engine 52 to at least one of the wheels 35 or 36 (thereby making the particular wheel 35 or 36 a drive wheel) by any means chosen with sound engineering judgment. In the preferred embodiment the drive system includes at least a first gear reduction device 10 such as a transmission, a differential or any other device known to those skilled in the art. The particular method for coupling the engine 52 to the gear reduction device 10 can be of any type chosen with sound engineering judgement. Similarly, the method for coupling the gear reduction device 10 to the drive wheel 36 can be of any type chosen with sound engineering judgement. In the preferred embodiment, the gear reduction device 10 is a transmission and is coupled to a drive axle 42 that is then coupled to the rear drive wheels 36 as shown in FIG. 2. Most preferably, the gear reduction device 10 is positioned "in line" with the drive axle 42. Thus, the gear reduction device 10 is substantially on the same horizontal plane with the drive axle 42 as shown in FIG. 2. It is also preferred that the gear reduction device 10 is longitudinally positioned between the mower deck 54 and the grass bag 56.

Referring now to FIG. 2, the frame 40 has first and second frame ends 45, 47 on opposing sides of the mower 50. As shown, these frame ends 45, 46 are the portions of the frame 40 that are positioned closest to the wheels 36. The frame 40 preferably includes first and second frame members 44, 46 vertically disposed and connected to the first and second frame ends 45, 47 as shown. Between the frame members 44, 46 may be positioned the support housing 16 for use in supporting various components as will be discussed further below. The support housing 16 includes a pair of side walls 16a, 16b. As shown, each side wall 16a, 16b has a portion extending inwardly thereby forming an "L" shape with the side walls. These extending portions may be used to further assemble to the frame 40 or other components not shown. Also as shown, the discharge chute 20 extends out from the rear of the mower 50 between the frame members 44, 46 and preferably between the side walls 16a, 16b. Preferably, an edge of the discharge chute 20 is connected to the side wall 16b with a connection flange 30 by any means chosen with sound engineering judgement such as welding or bolts.

Figure 3:
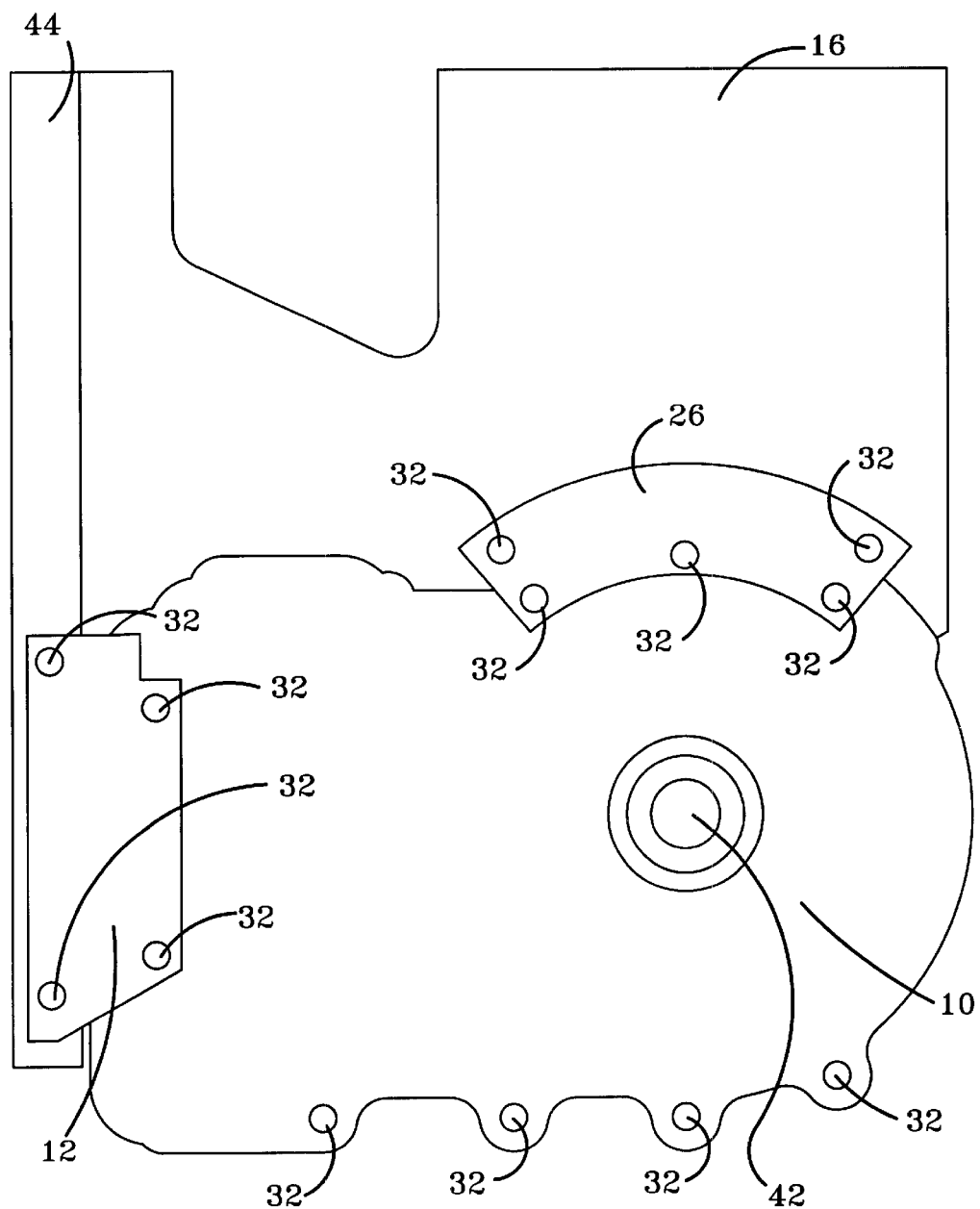
FIG. 3 is a side view of the transmission, showing the connecting plates.
Figure 4:
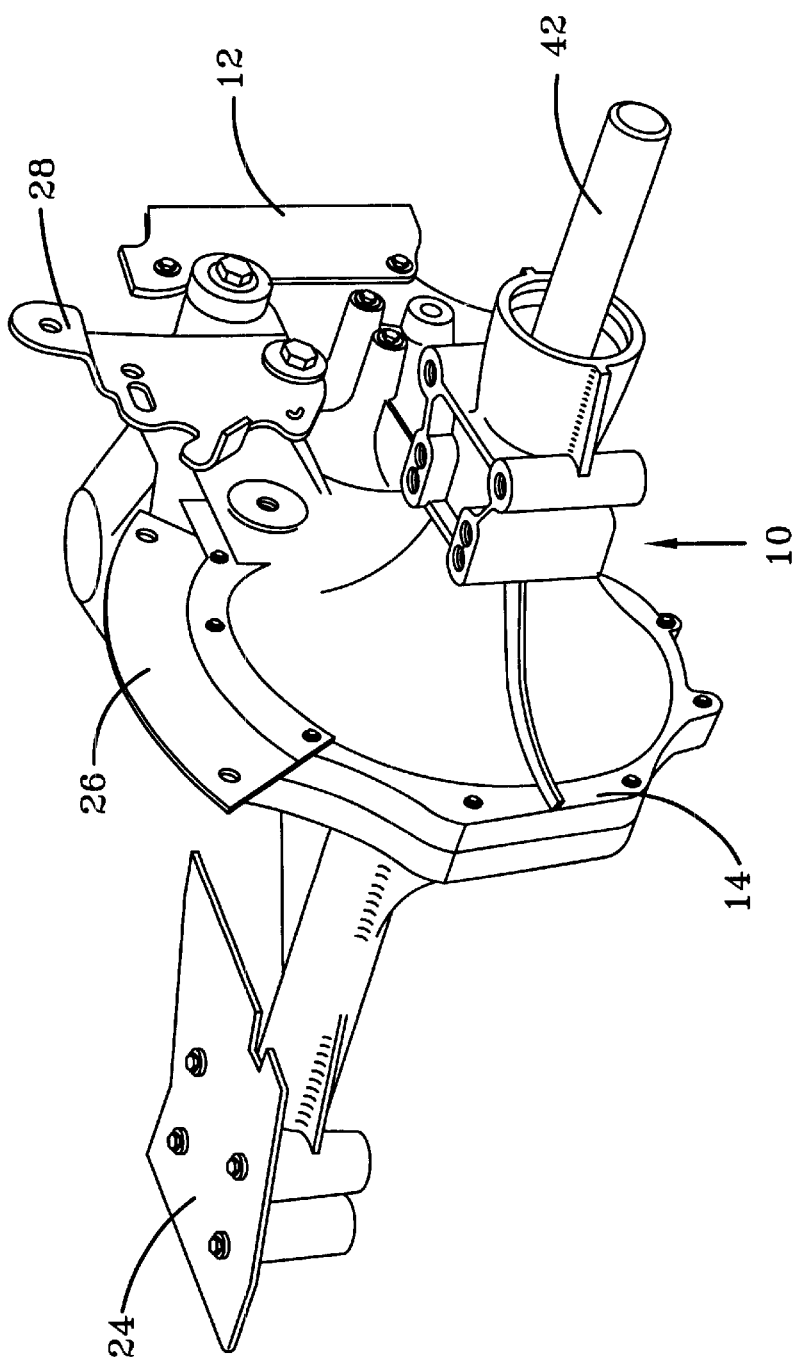
FIG. 4 is a perspective view of the transmission, showing a vertical connecting flange.
Figure 5:
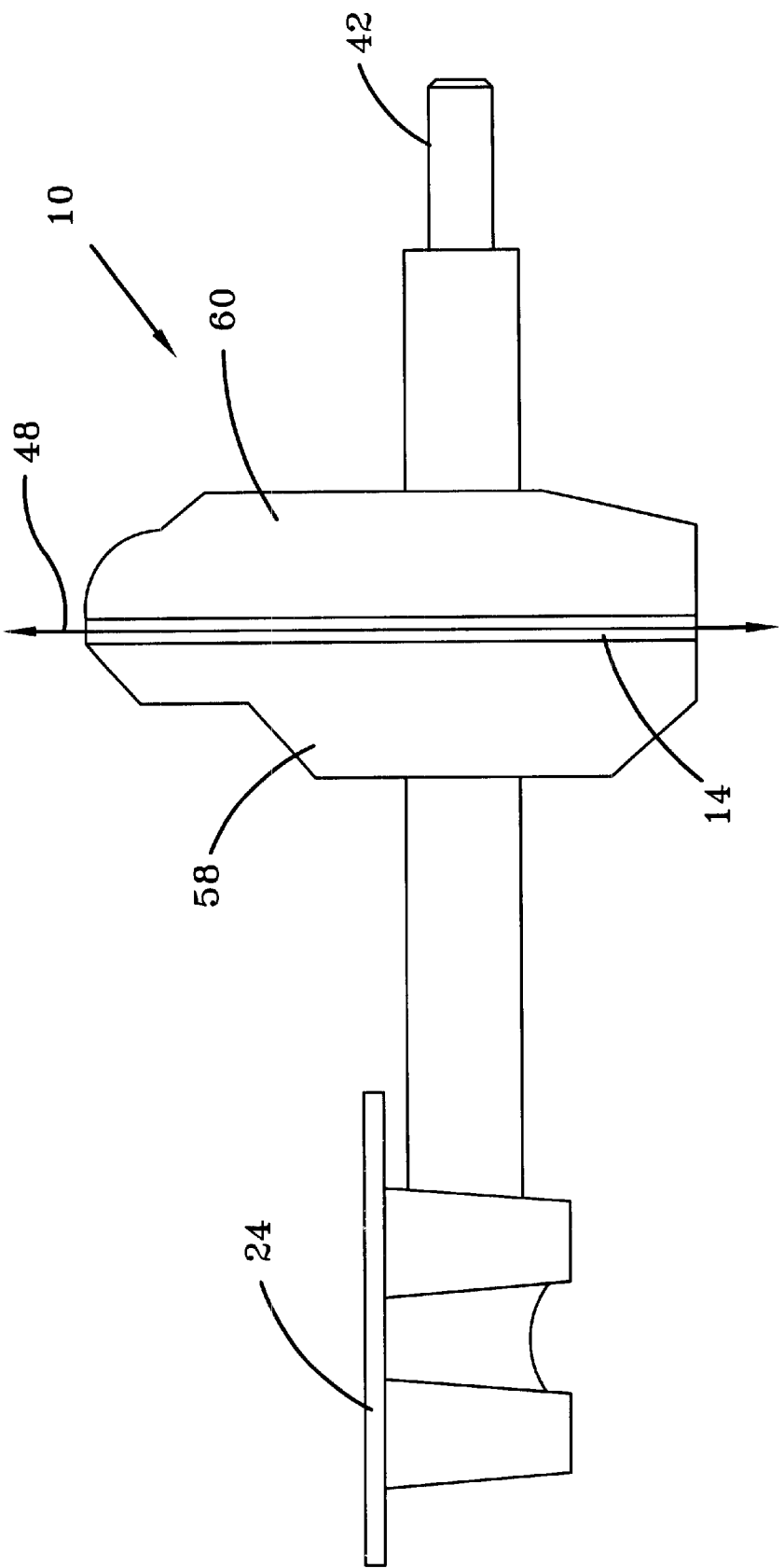
FIG. 5 is a front view of the transmission, showing the vertical axis and the vertical connecting flange.

With reference now to FIGS. 2–5, the preferred gear reduction device 10 includes first and second housing members 58, 60. The first and second housing members 58, 60 each have flange portions that can be connected to form a flange connection 14. Although the flange connection of most known gear reduction devices are oriented in a generally horizontal alignment, in the preferred embodiment for this invention the flange connection 14 is substantially vertical in alignment as shown. Thus, the flange connection 14 is substantially parallel to a vertical axis 48 (shown in FIG. 5). This vertical orientation of the flange connection 14 allows the gear reduction device 10 to be attached more easily to the frame 40 as well as to a side of a later to be described support housing 16. To further assist in the assembly of the gear reduction device 10 to the mower 50, first, third, and fourth connecting plates 12, 26 and 28 are connected to the flange connection 14 and are oriented substantially parallel to the flange connection 14 as shown. The first and third connecting plates, 12, 26, connect the gear reduction device 10 to the first frame member 44. FIG. 3 shows that the first connecting plate 12 is sleeve shaped and fits around first frame member 44, and connects the gear reduction device 10 to the first frame member 44 near the drive axle 42. The third connecting plate 26, as shown in FIG. 3, is preferably crescent-shaped. A second connecting plate 24 is connected to an end of the first housing member 58 at an orientation substantially perpendicular to the flange connection 14 and substantially parallel to the drive axle 42 as shown in FIGS. 4 and 5. This second connecting plate 24 is used to connect the gear reduction device 10 to the discharge chute 20. In the preferred embodiment then, the gear reduction device 10, as shown in FIGS. 2–5, has four connecting plates, 12, 24, 26, 28 for stability but may be connected to the mower 50 and discharge chute 20 by any number of connecting plates. The particular method for fastening the various plates 12, 24, 26, 28 to the gear reduction device 10, discharge chute 20, first frame member 44, and the support housing 16 can be any method chosen with sound engineering judgement such as by welding. In the preferred embodiment, however, a plurality of bolts 32 are used to secure all such connections.

With reference again to FIG. 2, it should be noted that both the gear reduction device 10 and the discharge chute 20 are in off-center positions. By "off-center position," it is meant that the component (whether the gear reduction device 10 or the discharge chute 20) is not laterally centered on the mower 50. To assist in illustrating this, a center line A-A indicates the lateral center of the mower 50 (equidistant between the frame members 44, 46), a center line B—B indicates the lateral center of the gear reduction device 10 and a center line C—C indicates the lateral center of the discharge chute 20. The off-center position of the gear reduction device 10 and the discharge chute 20 is illustrated by noting that center line B—B is laterally spaced (to the left as shown) a distance X1 from the center line A—A and that center line C—C is laterally spaced (to the right as shown) a distance Y1 from the center line A—A.

Still referring to FIG. 2, to assist in realizing the large cross-sectional area of the discharge chute 20 provided by this invention, the cross-sectional view at the rear of the mower 50 is shown as cut along a vertical plane that is parallel to the drive axle 42. In the preferred embodiment, the vertical plane intersects the drive axle 42. A cross-sectional area A1 (shown double hatched) of the discharge chute 20 is defined by the perimeter of the discharge chute 20 through the vertical plane that is parallel to the drive axle 42. A chute area A2 (shown single hatched) is provided through the vertical plane and is defined on the top by a horizontal line that intersects the top most edge 21 of the discharge chute 20, on the sides by first and second vertical lines D—D, E—E that intersect the first and second frame ends 45, 46 respectively, and on the bottom by the drive axle 42. In the preferred embodiment, the frame members 44, 46, are positioned substantially along the first and second vertical lines D—D, E—E. Also in the preferred embodiment, the bottom of the discharge chute 20 is supported by the second connecting plate 24. Another preference is that the perimeter of the discharge chute 20 that defines the cross-sectional area A1 is fully within the chute area A2. By fully within it is means that the area A1 is within the boarders of the area A2. Still another preference is that at least a portion of the gear reduction device 10 is within the chute area A2. This is visible by noting that a portion of the gear reduction device 10 is marked with single hatch marks.

With continuing reference to FIG. 2, the cross-sectional area A1 and the chute area A2 form an area ratio A1/A2. The present invention permits this area ratio to be maximized thereby providing a very large cross-sectional area for the discharge chute and a more direct route to the grass bag than currently known in the art. In this way, the operation of the mower 50 is also maximized. In the preferred embodiment, the area ratio A1/A2 is at least 0.25. It is more preferred that area ratio A1/A2 be at least 0.35. Most preferably, the area ratio A1/A2 is at least 0.50.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

What is claimed is:

1. A mower comprising:
   a frame having first and second frame ends on opposing sides of said mower;
   at least a first drive wheel having a drive axle and being operatively connected to said frame;
   an operator seat;
   a mower deck supported by said frame and including at least a first cutting blade for use in cutting associated vegetation;
   a discharge chute for use in transporting the associated vegetation from said mower deck, said discharge chute having a cross-sectional area A1 through a vertical plane that is parallel to said drive axle, the discharge chute extending under the operator seat in a substantially non-circuitous orientation;
   a transmission for use in driving said at least first drive wheel, said transmission being positioned in line with said drive axle;
   an engine for use in rotating said at least first cutting blade and for use in providing power to said transmission; and,
   wherein a chute area A2 is provided through said vertical plane, said chute area A2 being defined on the top by a horizontal line that intersects a top most edge of said discharge chute, on the sides by first and second vertical lines that intersect said first and second frame ends, and on the bottom by said drive axle, said cross-sectional area A1 and said chute area A2 forming an area ratio A1/A2 of at least 0.50.

2. The mower of claim 1 further comprising:
   a grass bag operatively connected to said frame for use in storing the associated vegetation cut by said cutting blade, said discharge chute for use in transporting the associated vegetation from said mower deck to said grass bag.

3. The mower of claim 2 wherein:
   said at least first drive wheel is a rear wheel;
   said grass bag is connected to a rear of said frame;
   said discharge chute extends from a rear portion of said mower deck to said grass bag; and,
   said transmission is longitudinally positioned between said mower deck and said grass bag.

4. The mower of claim 1 further comprising:
   a second drive wheel, said drive axle being a common drive axle for both said first and second drive wheels, said transmission being positioned between said first and second drive wheels.

5. The mower of claim 1 wherein said cross-sectional area A1 has a perimeter that is fully within said chute area A2.

6. The mower of claim 1 wherein said transmission comprises:
   first and second housing members each having flange portions that can be connected to form a flange connection, said flange connection being substantially vertical in alignment.

7. The mower of claim 1 wherein said discharge chute and said transmission are both in an off-center position.

8. The mower of claim 1 wherein said transmission is positioned at least partially within said chute area A2.

9. The mower of claim 1 further comprising:
   first and second frame members that extend along said first and second frame ends respectively;
   a support housing positioned between said first and second frame members and including first and second side walls; and,
   wherein said discharge chute extends between said first and second side walls of said support housing.

10. A mower comprising:
    a frame having first and second frame ends on opposing sides of said mower;
    first and second drive wheels having a common drive axle and being operatively connected to a rear of said frame;
    a mower deck supported by said frame and including at least a first cutting blade for use in cutting associated vegetation;

an operator seat;

a grass bag operatively connected to a rear of said frame for use in storing the associated vegetation cut by said cutting blade;

a discharge chute for use in transporting the associated vegetation from a rear of said mower deck to said grass bag, said discharge chute having a cross-sectional area A1 through a vertical plane that is parallel to said drive axle, the discharge chute extending under the operator seat in a substantially non-circuitous orientation;

a transmission for use in driving said first and second drive wheels, said transmission being positioned between said first and second drive wheels and being positioned in line with said common drive axle, said transmission being longitudinally positioned between said mower deck and said grass bag;

an engine mounted to a front of said frame for use in rotating said at least first cutting blade and for use in providing power to said transmission; and, wherein a chute area A2 is provided through said vertical plane, said chute area A2 being defined on the top by a horizontal line that intersects a top most edge of said discharge chute, on the sides by first and second vertical lines that intersect said first and second frame ends, and on the bottom by said drive axle, said cross-sectional area A1 and said chute area A2 forming an area ratio A1/A2 of at least 0.50.

11. The mower of claim 10 wherein said transmission comprises:

first and second housing members each having flange portions that can be connected to form a flange connection, said flange connection being substantially vertical in alignment.

12. The mower of claim 11 wherein said discharge chute and said transmission are both in an off-center position.

13. The mower of claim 12 wherein said transmission is positioned at least partially within said chute area A2.

14. A vehicle for cutting vegetation comprising:

a frame having first and second frame ends on opposing sides of said vehicle;

at least a first drive wheel having a drive axle and being operatively connected to said frame;

a chute having a cross-sectional area A1 through a vertical plane that intersects said drive axle, the chute having a substantially non-circuitous orientation;

a transmission for use in driving said at least first drive wheel, said transmission being positioned in line with said drive axle;

an engine for use in providing power to said transmission; and, wherein a chute area A2 is provided through said vertical plane, said chute area A2 being defined on the top by a horizontal line that intersects a top most edge of said chute, on the sides by first and second vertical lines that intersect said first and second frame ends, and on the bottom by said drive axle, said cross-sectional area A1 and said chute area A2 forming an area ratio A1/A2 of at least 0.50.

15. The vehicle of claim 14 wherein said gear reduction device comprises:

first and second housing members each having flange portions that can be connected to form a flange connection, said flange connection being substantially vertical in alignment; and, wherein said transmission is positioned at least partially within said chute area A2.

* * * * *